United States Patent Office 3,240,025
Patented Mar. 15, 1966

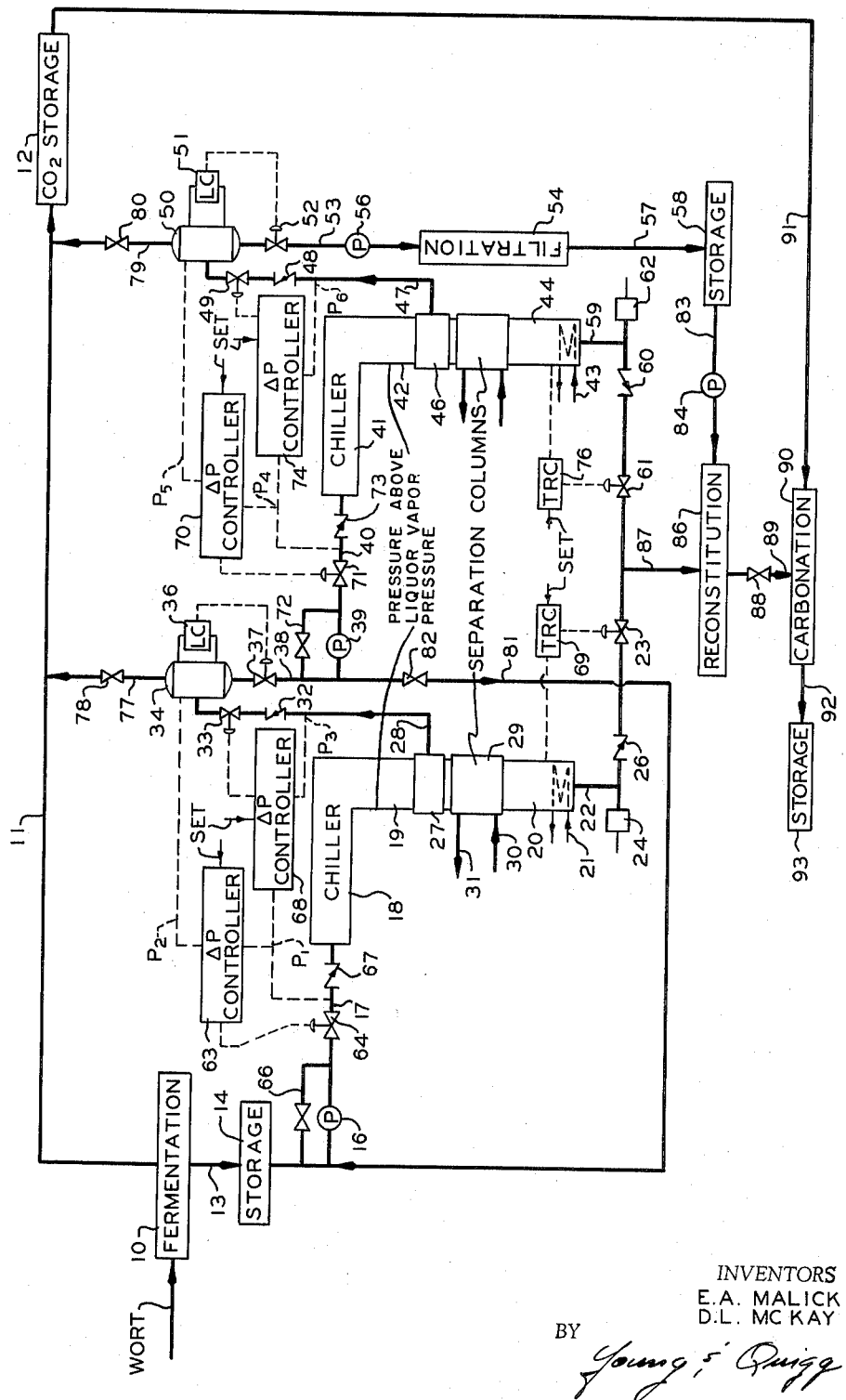

3,240,025
CONCENTRATING BEER CONTAINING CARBON DIOXIDE BY CRYSTALLIZATION AT ELEVATED PRESSURE
Emil A. Malick and Dwight L. McKay, Bartlesville, Okla., assignors to Phillips Petroleum Company, a corporation of Delaware
Filed July 5, 1962, Ser. No. 207,581
7 Claims. (Cl. 62—58)

This invention relates to a method of concentrating solutions by crystallization. In another aspect it relates to an improved method of using a crystal purification column for the removal of water from beer.

The concentration of aqueous solutions such as fruit juices, wine, and beer by crystallization to remove water therefrom presents a number of advantages. Substantial savings can be realized in packaging, freight and storage of the product. Also beer which has been concentrated by crystallization, filtered and reconstituted has a longer shelf-life than beer which has not been processed in this manner. Concentrating beer by crystallization followed by filtration of the concentrate can serve as an accelerated lagering process and thus greatly reduce the requirements in breweries for large inventories and refrigerated storage tanks.

One very favorable method of concentrating such solutions by crystallization makes use of crystal purification columns such as are described in the patent to Schmidt, Re. 23,810 and the patent to R. W. Thomas, 2,854,494. The use of these crystal purification columns involves the formation of a crystal slurry by cooling the product to be concentrated and then forcing the resulting slurry of crystals and mother liquor into an elongated confined separation zone. The crystals are moved in a compact mass into a body of liquid which is formed by melting the crystals in a downstream portion of the concentration zone. A portion of the crystal melt is displaced back into the advancing crystal mass to remove occluded mother liquor therefrom. The crystals enter the column at a temperature below the melting point of pure water so that they are warmed and ultimately melted as they are passed through the separation zone. When concentrating beer, it is desired that substantially pure water be withdrawn from a downstream portion of the zone while mother liquor, which is a beer concentrate, be withdrawn from a mid-section of the concentration zone substantially undiluted with crystal melt.

When beer as it is received from fermentation is concentrated using crystal purification columns described above, by operating according to normal procedures the efficiency of the concentration is not as high as would be expected. We have discovered that the cause of this loss in efficiency lies in the presence of carbon dioxide which is present in the beer from the fermentors in amounts of about 1 to 2 volumes of carbon dioxide at standard temperature and pressure (1 atmosphere and 60° F.) per volume of liquid beer. We have found that this carbon dioxide which is present in beer creates channeling in the crystal mass within the separation unit so that some of the crystal melt passes through the crystal mass and dilutes the beer concentrate removed from the mid-section of the separation zone. As the ice crystals form in the beer the carbon dioxide is concentrated in the mother liquor and even though the temperature is greatly reduced so that the solubility of carbon dioxide is greater there is still a sufficient amount of this gas which escapes from the mother liquor and passes through the crystal bed to create the problem described above. Carbon dioxide could be removed from the beer prior to concentration thereof but this has the disadvantage that an extra step would be required for removal of the carbon dioxide, all of which must be replaced in the final carbonation step before the beer can be marketed.

According to our invention the above problem is overcome by operating the crystal purification column under pressure substantially above the equilibrium pressure of carbon dioxide in the mother liquor. The pressure is, therefore, sufficient to prevent carbon dioxide from escaping from the mother liquor while the mother liquor is present in the separation column. As applied to fruit juices and extracts containing volatile components such as esters and essences, sufficient pressure is maintained to keep these components in solution in the concentrated mother liquor. Operating substantially above the vapor pressure of such solutions permits adequate pressure to be maintained in the downstream processing and storage facilities to avoid loss of these valuable components. Preferably the pressure is exerted on both the chiller and the separation column since these two units should be under substantially the same pressure in order to minimize the problem of transferring the slurry from the chiller to the separation column. In most cases the chiller and the separation column are constructed as a single unit. According to a preferred aspect of our invention multiple steps of chilling the liquid for crystal formation and subsequent concentration in a separation column are used in series. Alternatively, mother liquor is recycled from the separation column back to the chiller. Also a combination of series operations and recycle can be employed. In a preferred aspect the pressure is reduced on at least a portion of the mother liquor after it is withdrawn from the separation column so that the vapor pressure or the equilibrium pressure of the carbon dioxide can be determined directly and/or some of the carbon dioxide released. The mother liquor is then passed to the next chiller or recycled to a prior chiller in the operation as desired.

It is an object of our invention to provide an improved method of concentrating solutions by crystallization. Another object of our invention is to provide a method for concentrating beer using the crystal purification units such as disclosed by the Schmidt and Thomas patents cited above. Another object is to provide a method of eliminating channeling in the crystal separation column used for the concentration of beer from fermentation. Still another object is to provide a method of concentrating beer as it comes from the fermentors without prior removal of carbon dioxide. Another object of our invention is to provide a method for purifying beer by crystallization and filtration. Other objects and advantages and features of our invention will be apparent to those skilled in the art from the following discussion and drawing which is a schematic flow diagram illustrating one embodiment of our invention.

While our invention is described primarily as applied to beer, it can also be used in concentrating wine, fruit juices, and the like. It should be understood that by "beer" we mean any fermentated beverage, such as beer, ale or equivalent product, which contains carbon dioxide. Beer as it leaves the fermentors contains carbon dioxide ordinarily in an amount of about 1 to 2 volumes per volume of the beer. In most cases the beer from the fermentors contains about 1.5 to 1.8 volumes of carbon dioxide per volume of beer. It is preferred to concentrate the beer to about 25 percent of its original volume. The total concentrate is then filtered and the filtrate can be packaged and stored. Alternatively the filtrate can be reconstituted by addition of water before it leaves the brewery.

An essential feature of our invention lies in the use of the crystal purification columns. Beer as it comes from the fermentation step of the brewing process is chilled so that ice crystals are formed, normally to about 20 to 50 weight percent solids. The resulting slurry of ice crystals and mother liquor is passed into a crystal separation column operated as described above. In order to prevent the carbon dioxide from evolving from the mother liquor within this column, pressure sufficient to prevent such evolvement is applied thereto. Ordinarily between 50 and 250 p.s.i.g. will be sufficient although higher or lower pressures can be used. The pressure used depends upon the circumstances of the individual operation as required by the temperature of the mother liquor in the separation column and the degree of concentration effected. The pressure must be at least sufficient to prevent gas from evolving from the mother liquor. The pressure in the column can best be controlled by regulating the pressure of the feed stream. This feed is normally about 25 to 200 p.s.i. above the equilibrium pressure of the carbon dioxide in the mother liquor from the column.

In order to explain further the process of our invention, reference is now made to the drawing.

As illustrated in the drawing, wort is passed to fermentation step 10 which is the final stage of the brewing process. Yeast is added and during the course of the fermentation carbon dioxide is evolved and passed through conduit 11 to carbon dioxide storage 12. It is preferred that the carbon dioxide be liquefied in storage so that all air can be removed therefrom. After completion of fermentation, the beer is passed through conduit 13 to intermediate storage 14. The concentration step is begun by passing the beer from storage 14 by pump 16 through conduit 17 into chiller 18. Here the beer is cooled so that a slurry of ice crystals is formed in beer concentrate mother liquor. The solids content of this slurry should be as high as possible and the limiting factor will be the thickness of the slurry. If the slurry is too stiff it cannot be readily moved into and through the separation column. Ordinarily crystal slurries having greater than 50 percent solids cannot be efficiently processed. More frequently the solids content of the slurry is in the range of about 25 to 40 percent of the total slurry on a weight basis.

This slurry of ice crystals and mother liquor is passed from chiller 18 into separation column 19. As stated above, the chiller 18 and separation column 19 can be constructed as a single unit with the chiller being an upstream extension of the concentration column, as shown, or the units can be separate and connected with a conduit. In separation column 19 the ice crystals are forced in a compact mass through the column into a body of water in the downstream end 20. This water is formed by melting the ice crystals by means of heating element 21, such as a resistance coil or a steam line. Water is removed from the downstream end 20 of column 19 through conduit 22 but the rate of water removal is restricted by motor valve 23 so that water is displaced by pulse unit 24 back into the advancing crystal mass. Check valve 26 prevents back flow of water through valve 23 on the back stroke of pulse unit 24. As the crystal mass is forced forward the mother liquor is displaced from the column through filter section 27 from which it is withdrawn through conduit 28. If desired, the crystal mass in column 19 can be warmed slightly by circulating a heat exchange fluid through jacket 29 having inlet 30 and outlet 31.

The mother liquor in conduct 28 is passed through check valve 32 and motor valve 33 into accumulator 34. A vapor space is maintained in accumulator 34 by liquid level controller 36 operatively connected to motor valve 37 in liquid outlet conduct 38.

In the embodiment illustrated employing two units in series, the mother liquor is then passed by pump 39 through conduit 40 into a second chiller 41. The crystal forming operation is repeated in chiller 41 to produce a slurry of ice crystals in mother liquor which is a still more highly concentrated beer. The resulting slurry is passed into a second separation column 42. Operating in the same manner as described in connection with column 19, the crystal melt is formed by heating elements 43 in the downstream portion 44 of column 42 and mother liquor is withdrawn through filter section 46 at a mid-section of the column. Mother liquor having its ultimate desired concentration is withdrawn from column 42 through conduit 47 and passed through check valve 48 and motor valve 49 to accumulator 50. A vapor phase is maintained in accumulator 50 by liquid level controller 51 operatively connected to motor valve 52 in liquid outlet conduit 53. The concentrated mother liquor is very cold at this point so that fine solids and crystallized impurities can be removed therefrom in filters 54 through which the cold concentrate is passed by pump 56. This duplicates a procedure which requires many weeks of refrigerated storage in the lagering process. The filtered beer concentrate is then passed through line 57 to concentrate storage 58. The water from column 42 is withdrawn through conduit 59 and passed through check valve 60 and motor valve 61. Pulse unit 62 operates in the same manner as described for unit 24.

In order to prevent carbon dioxide from escaping from the mother liquor as it is concentrated and passed through the concentration columns 19 and 42, the hydrostatic pressure in these columns is maintained substantially above the equilibrium pressure of the carbon dioxide in the concentrated mother liquor. The temperature of the mother liquor in accumulators 34 and 50 is very near that of the mother liquor in columns 19 and 42, respectively. Since a vapor space is present in the accumulators, the pressures therein are the equilibrium pressures of carbon dioxide in the respective concentrates. This pressure $P_2$ in accumulator 34 is sensed and transmitted to differential pressure controller 63. The pressure $P_1$ of the feed stream in conduit 17 entering chiller 18 is also sensed and transmitted to controller 63. This pressure is regulated by manipulating motor valve 64 downstream from pump 16 which is equipped with a conventional valved bypass 66. Check valve 67 in conduit 17 prevents back flow in conduit 17 on the forward stroke of pulse unit 24. Preferably the feed pressure is sensed between valves 64 and 67. Controller 63 is set to maintain a predetermined differential between pressures $P_1$ and $P_2$, $P_1$ being substantially greater than $P_2$. For example, it is preferred that pressure $P_1$ of the feed to chiller 18 be about 50 to 100 p.s.i. above the equilibrium pressure $P_2$ of the mother liquor in accumulator 34. This feed pressure is maintained by controller 63 manipulating motor valve 64.

The pressure within column 19 is maintained at least as high and preferably higher than the feed pressure to chiller 18. The pressure of the withdrawn mother liquor in conduit 28 can be higher than the feed pressure in conduit 17 because of the action of pulse unit 24. The outlet pressure of column 19 is regulated by motor valve 33 in conduit 28. Back flow in conduit 28 on the back stroke of pulse unit 24 is prevented by check valve 32. The column outlet pressure $P_3$ is sensed and transmitted to differential pressure controller 68. The feed pressure $P_1$ is also transmitted to controller 68 which is preset to maintain $P_3$ substantially above (for example, about 5 to 100, preferably 15 to 40 p.s.i. above) $P_1$ by manipulating motor valve 33. The column 19 is operated at a desired separation efficiency by controlling the rate of water take-off through conduit 22 by manipulating motor valve 23 with temperature recorder controller 69. Controller 69 is set to maintain a predetermined temperature in the crystal melt in the bottom of column 19.

The operation described above in connection with column 19 is duplicated to produce a greater concentration of the beer in column 42. The equilibrium pressure $P_5$ in accumulator 50 and the feed pressure $P_4$ in conduit 40 are sensed and transmitted to differential pressure controller 70. Feed pressure $P_4$ is controlled by manipulating motor valve 71 in conduit 40 downstream from pump 39 equipped with valved bypass 72. Conduit 40 also has a check valve 73. Controller 70 is set to maintain feed pressure $P_4$ substantially above (for example, about 50 to 100 p.s.i. above) equilibrium pressure $P_5$. Differential pressure controller 74 to which is transmitted feed pressure $P_4$ and the mother liquor outlet pressure $P_6$ is set to maintain $P_6$ and $P_4$ (as described for controller 68) by manipulating valve 49. Temperature recorder controller 76 is set to maintain a desired crystal melt temperature in column 42 by manipulating valve 61 in conduit 59.

A small amount of carbon dioxide can be released from accumulator 34 through conduit 77 containing valve 78. This release must be slow enough to avoid disrupting the pressure control system. Also compensation must be made in setting controller 63 for the thus induced decrease in equilibrium pressure in accumulator 34 from the true equilibrium pressure of carbon dioxide in the mother liquor as withdrawn from column 19. A similar release of carbon dioxide can be made from accumulator 50 through conduit 79 containing valve 80. Carbon dioxide thus released from the accumulators is passed to storage 12.

As an alternative to using two or more sets of chillers and separation columns in series, mother liquor withdrawn from a column can be recycled to the chiller feeding this column. As shown in the drawing, mother liquor in conduit 38 from accumulator 34 can be passed through conduit 81 by opening valve 82, thereby feeding mother liquor to pump 16. This method of operating has the advantage in that the feed to chiller 18 is richer in beer components of alcohol and sugar so that lower temperatures can be obtained in the chiller, providing a greater temperature differential in the separation column. With this greater temperature differential more refreezing of the crystal melt is obtained and the column can be operated more efficiently. Also a portion of the concentrate in conduit 38 can be recycled to chiller 18 and a portion of the concentrate from conduit 53 can be recycled to chiller 41. Using a plurality of chiller and concentration column units it can be readily seen that a number of different combinations of series and parallel flow relationships with recycle of concentrate can be provided.

In another alternate method of operating, all of the concentrate in conduit 53 can be decarbonated by pressure reduction and all or a portion of the thus decarbonated concentrate passed to filtration unit 54. By proceeding in this manner the filters do not have to be operated under pressure. Decarbonation can also be effected on the filtered concentrate in conduit 57 so that the storage vessel 58 need not be held under superatmospheric pressure. Partial decarbonation of the concentrate is relatively simple since all that is required is a reduction of gauge pressure. It should be understood that complete decarbonation of the concentrate is undesirable and would not be accomplished without using subatmospheric pressure or heat which is undesirable at this point.

Beer concentrate from storage 58 can be packaged and shipped as concentrate. Even if this is not done, however, and reconstitution is carried out within the brewery, the steps of concentration and filtration as described are highly desirable in improving the quality of the beer and in extending its shelf-life. Immediate reconstitution can be carried out by passing the beer concentrate from storage 58 through conduit 83 by pump 84 to reconstitution or diluting step 86. Water withdrawn from column 19 through conduit 22 is joined with the water in conduit 59 from column 42 and passes through conduit 87 to diluting step 86. Reconstitution with the purified water removed from separation columns 19 and 42 is highly desirable since this water has the correct mineral content and also may contain trace amounts of alcohol and/or extract from the beer. If the water is not to be used for reconstitution, it can be discharged to waste.

Reconstituted beer is passed through valve 88 and conduit 89 to carbonation step 90. Here the reconstituted beer is contacted with carbon dioxide from storage 12 which is passed through conduit 91. The finished beer is then passed through conduit 92 to storage 93 from which it is ultimately metered and packaged. In carbonation step 90 ordinarily about 1 volume of carbon dioxide is added per volume of beer. This of course depends upon the concentration of carbon dioxide in the reconstituted beer since the finished product should contain about 2.5 to 2.8 volumes of carbon dioxide per volume of beer. If some of the concentrate has been decarbonated, more carbon dioxide must be added in the carbonation step. Reconstitution and carbonation can be carried out in a single step.

In order to illustrate our invention further the following example is presented. The conditions and proportions are typical only and should not be construed to limit our invention unduly.

Beer from a brewing fermentation step and containing 1.65 volume of carbon dioxide (STP) per volume of liquid is cooled in a first chiller to form a slurry. The beer from the fermentor contains 3.75 percent alcohol and 4.25 percent extract with the remainder water and carbon dioxide. The beer is cooled in the first chiller to 24° F., thereby forming a slurry of ice crystals in mother liquor, the slurry having a solids content of 50 percent. This slurry is passed through a first crystal separation column wherein the ice crystals are melted and the resulting melt is withdrawn as purified water. Based upon 100 pounds of beer fed to the first chiller, 50 pounds of water and 50 pounds of mother liquor are withdrawn from the first separation column. This mother liquor is passed to a second chiller where the temperature is lowered to 13.5° F. forming a slurry of 50 percent solids. This slurry is passed through a second separation column from which 25 pounds of water are removed and 25 pounds of beer concentrate are obtained. The equilibrium pressure of the carbon dioxide in the mother liquor from the first separation column is about 10 p.s.i.g. and the equilibrium pressure in the mother liquor from the second column is about 40 p.s.i.g. The feed pressure to each chiller is maintained about 75 p.s.i. above the equilibrium pressure of the carbon dioxide in the corresponding mother liquor. Thus the feed pressure to the first chiller is about 85 p.s.i.g. and about 115 p.s.i.g. to the second chiller. The mother liquor outlet pressure from each column is maintained about 25 p.s.i. above the corresponding chiller feed pressure. Thus the mother liquor discharge from the first column is regulated to maintain the outlet pressure at about 110 p.s.i.g. and from the second column about 140 p.s.i.g. Thus pressures within the separation columns are at all times maintained high enough that no gaseous carbon dioxide is evolved therein.

The beer concentrate is filtered and reconstituted by adding thereto the water removed in the concentration columns so that a purified beer having its original alcohol, extract and carbon dioxide content as received from the fermentors is obtained. The reconstituted beer is carbonated by adding thereto 1 volume of carbon dioxide per volume of beer and the product is then metered and packaged for marketing.

As will be apparent to those skilled in the art various modifications can be made in our invention without departing from the spirit or scope thereof.

We claim:

1. A process for concentrating beer containing carbon dioxide which comprises cooling said beer in a chiller to form a slurry of ice crystals in mother liquor, passing said slurry into an elongated, confined separation zone wherein said ice crystals are moved in a compact mass into a body of water formed by melting the ice crystals in a downstream portion of said zone while displacing water from said body back into the advancing crystal mass, withdrawing water from said downstream portion of said zone, withdrawing mother liquor from a mid-section of said zone, maintaining said chiller and said separation zone under sufficient pressure to keep carbon dioxide from evolving from said mother liquor in said separation zone, releasing the pressure on at least a portion of the withdrawn mother liquor so that carbon dioxide is evolved therefrom, separating carbon dioxide from the withdrawn mother liquor after the pressure has been reduced, and recycling mother liquor thus vented to said chiller.

2. A process for concentrating beer containing about 1 to 2 volumes of carbon dioxide at standard temperature and pressure per volume of liquid beer which comprises passing said beer under a first elevated pressure into a chiller to form a slurry of 20 to 50 weight percent ice crystals in mother liquor, passing said slurry under substantially said first pressure into an elongated, confined separation zone wherein said ice crystals are moved in a compact mass into a body of water formed by melting the ice crystals in a downstream portion of said zone while displacing water from said body back into the advancing crystal mass, withdrawing water from said downstream portion of said zone, withdrawing mother liquor from a mid-section of said zone, passing said withdrawn mother liquor into a closed accumulation chamber having a vapor phase at a second pressure, sensing said first and second pressures, producing a control signal in response to the difference between said first and second pressures, and applying said signal to maintain said first pressure substantially greater than said second pressure.

3. The process of claim 2 wherein said first pressure is maintained about 50 to 100 p.s.i. greater than said second pressure.

4. A process for concentrating beer containing about 1 to 2 volumes of carbon dioxide at standard temperature and pressure per volume of liquid beer which comprises passing said beer under a first elevated pressure into a chiller to form a slurry of 20 to 50 weight percent ice crystals in mother liquor, passing said slurry under substantially said first pressure into an elongated, confined separation zone wherein said ice crystals are moved in a compact mass into a body of water formed by melting the ice crystals in a downstream portion of said zone while displacing water from said body back into the advancing crystal mass, withdrawing water from said downstream portion of said zone, withdrawing mother liquor from a mid-section of said zone, passing said withdrawn mother liquor through a pressure reducing valve into a closed accumulation chamber having a vapor phase at a second pressure, sensing said first and second pressures, producing a control signal in response to the difference between said first and second pressures, applying said signal to maintain said first pressure substantially greater than said second pressure, sensing the pressure of said mother liquor as withdrawn from said separation zone, producing a second control signal in response to the difference between said first pressure and said mother liquor pressure, and applying said second signal to manipulate said valve to maintain said mother liquor pressure above said first pressure.

5. The process of claim 4 wherein said vapor space in said accumulation chamber is maintained by liquid level control.

6. A process for concentrating beer containing carbon dioxide which comprises passing said beer under a first elevated pressure into a chiller to form a slurry of ice crystals in mother liquor, passing said slurry under substantially said first pressure into an elongated, confined separation zone wherein said ice crystals are moved in a compact mass into a body of water formed by melting the ice crystals in a downstream portion of said zone while displacing water from said body back into the advancing crystal mass, withdrawing water from said downstream portion of said zone, withdrawing mother liquor from a mid-section of said zone, passing said withdrawn mother liquor into a closed accumulation chamber having a vapor phase at a second pressure, sensing said first and second pressures, producing a control signal in response to the difference between said first and second pressures, and applying said signal to maintain said first pressure substantially greater than said second pressure.

7. The process of claim 5 wherein, following separation of carbon dioxide from said withdrawn mother liquor, a first portion of said mother liquor is recycled to said chiller and a second portion is passed to a second cooling step and subsequent separation zone for further concentration.

References Cited by the Examiner

UNITED STATES PATENTS

| 2,116,939 | 5/1938 | Zahm | 99—49 |
| 2,815,364 | 12/1957 | Green | 62—58 |
| 2,854,494 | 9/1958 | Thomas | 62—58 |
| 2,986,587 | 5/1961 | Hess | 260—707 |
| 3,017,751 | 1/1962 | Hawkins | 62—58 |
| 3,082,211 | 3/1963 | Green | 260—707 |

FOREIGN PATENTS 841,374  7/1960  Great Britain.

NORMAN YUDKOFF, *Primary Examiner.*